(12) United States Patent
Huang et al.

(10) Patent No.: US 12,409,430 B2
(45) Date of Patent: Sep. 9, 2025

(54) STARCH-EMBEDDED AROMA SUBSTANCE MICROCAPSULE AND PREPARATION METHOD THEREFOR

(71) Applicants: SOUTH CHINA UNIVERSITY OF TECHNOLOGY, Guangzhou (CN); SOUTH CHINA UNIVERSITY OF TECHNOLOGY-ZHUHAI INSTITUTE OF MODERN INDUSTRIAL INNOVATION, Zhuhai (CN)

(72) Inventors: Qiang Huang, Guangzhou (CN); Qing Gao, Guangzhou (CN); Bin Zhang, Guangzhou (CN); Xiong Fu, Guangzhou (CN)

(73) Assignees: SOUTH CHINA UNIVERSITY OF TECHNOLOGY, Guangzhou (CN); SOUTH CHINA UNIVERSITY OF TECHNOLOGY-ZHUHAI INSTITUTE OF MODERN INDUSTRIAL INNOVATION, Zhuhai (CN)

( * ) Notice: Subject to any disclaimer, the term of this patent is extended or adjusted under 35 U.S.C. 154(b) by 508 days.

(21) Appl. No.: 17/986,178

(22) Filed: Nov. 14, 2022

(65) Prior Publication Data

US 2023/0079081 A1    Mar. 16, 2023

Related U.S. Application Data

(63) Continuation of application No. PCT/CN2021/122770, filed on Oct. 9, 2021.

(30) Foreign Application Priority Data

Nov. 5, 2020    (CN) .......................... 202011224511.3

(51) Int. Cl.
  *B01J 13/08*    (2006.01)
  *A23L 27/00*    (2016.01)
  *B01J 13/20*    (2006.01)
  *C08B 30/04*    (2006.01)
  *C11B 9/00*    (2006.01)

(52) U.S. Cl.
  CPC ............... *B01J 13/08* (2013.01); *A23L 27/72* (2016.08); *B01J 13/206* (2013.01); *C08B 30/044* (2013.01); *C11B 9/0061* (2013.01); *A23V 2002/00* (2013.01)

(58) Field of Classification Search
  CPC .......... B01J 13/02; B01J 13/206; B01J 13/08; C08L 3/02; C11B 9/0061; C08B 30/12; C08B 30/044; A23L 27/72; A23L 27/70; A23V 2002/00; Y02P 20/54
  USPC ...................................................... 512/4, 1
  See application file for complete search history.

(56) References Cited

FOREIGN PATENT DOCUMENTS

| CN | 104224751 B | * 10/2017 | |
| CN | 111659327 B | * 7/2021 | ............. B01J 13/02 |

OTHER PUBLICATIONS

Sun et al, CN 104224751 Machine Translation, Oct. 27, 2017 (Year: 2017).*
Huang et al, CN 111659327 Machine Translation, Jul. 13, 2021 (Year: 2021).*

* cited by examiner

*Primary Examiner* — Jessica Whiteley
(74) *Attorney, Agent, or Firm* — WPAT, PC

(57) ABSTRACT

Disclosed in the present invention are a starch-embedded aroma substance microcapsule and a preparation method therefor. The method comprises: performing degreasing treatment on starch, gelatinizing the starch at high temperature, sequentially adding aroma substances having different molecular sizes into the starch paste, and compounding at high temperature; and finally, cooling, centrifuging, washing, and drying to obtain an aroma substance microcapsule. The total embedding rate of the aroma substances in the obtained microcapsule can reach 46.64%. The present invention is simple and convenient in process, and easy in condition control, does not need large special equipment, and has low cost and high efficiency.

10 Claims, 1 Drawing Sheet

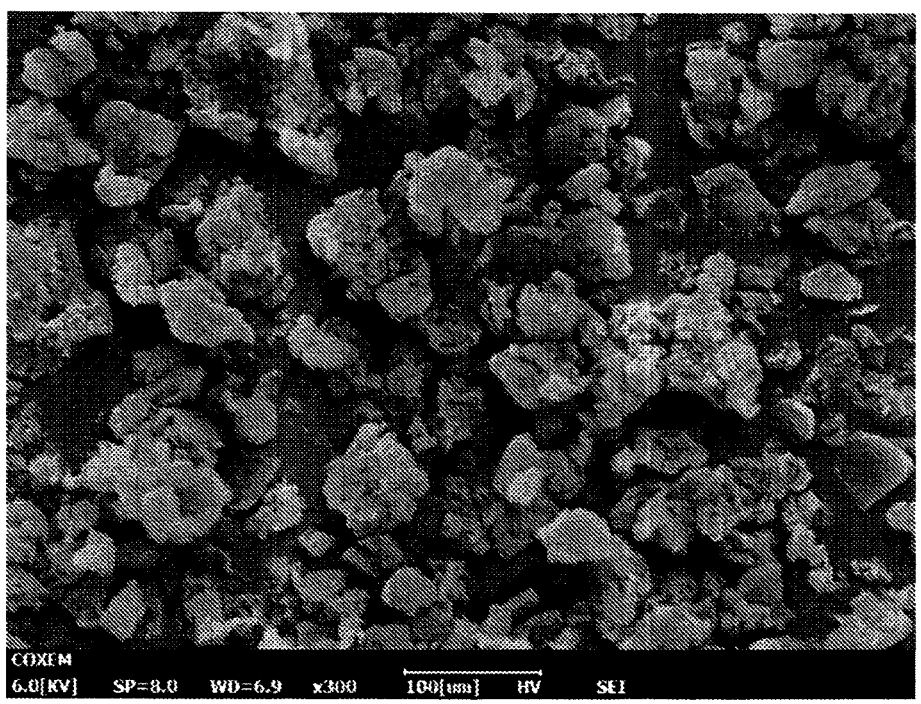

STARCH-EMBEDDED AROMA SUBSTANCE MICROCAPSULE AND PREPARATION METHOD THEREFOR

BACKGROUND OF THE INVENTION

1. Field of the Invention

The present invention relates to embedding of aroma substances, particularly relates to a preparation method for a starch-embedded aroma substance microcapsule, which relates to one-step or step-by-step embedding of aroma substances, and belongs to the field of food industry and daily-use chemical industry.

2. Description of Related Art

There are many kinds of aroma substances in food and food raw materials, including alcohols, aldehydes, ketones, esters, lactones, acids, phenols, heterocyclic compounds, sulfur-containing compounds, etc. For example, the aroma substances in fruits are mainly organic acid esters, aldehydes and terpenes, followed by alcohols, ketones and volatile acids. Most of them have strong volatility and are unstable to various external factors such as oxygen, light, heat and pH. This will affect their overall aroma type and the quality of the final product, limiting their applications in industrial production. Microencapsulation of aroma substances can protect and slow release their effective ingredients, and further broaden the application in food and daily chemical formulations.

At present, the embedding of aroma substances mainly adopts a solid-state microcapsule and a liquid-state emulsion. Solid microcapsule mainly use carbohydrates, such as maltodextrin, gum, modified starch (U.S. Pat. No. 3,971,852), β-cyclodextrin (Ayiramuthu et al., 2011, Journal of Industrial Textiles, 42 (2) 132-144; Chai et al., 2011, Advanced Materials Research, 233-235, 1766-1773; Cevallos et al., 2011, Journal of Food Engineering, 99(1), 70-75), whey protein and polyvinyl alcohol (Tatlisu et al., 2019, Food Packaging and Shelf Life, 21, 100347) as carriers alone or in combination for co-precipitation, spray drying or electrospinning, etc. There are problems such as low loading rate, cumbersome operation steps, and high energy consumption. Liquid-state emulsion is to firstly put hydrophobic aroma substances in a specific oil phase, and add emulsifiers, such as saponins (Doost et al., 2019, Food Chemistry, 293, 134-143), sodium caseinate (Pan et al., 2014. J Agric Food Chem, 62(7), 1649-1657), etc., so as to form an oil-in-water emulsion. But there are many problems at present, such as unstable emulsions or higher emulsifier dosage, and being inconvenient to store and transport.

Keatkrai et al (Keatkrai et al., 2016, International Journal of Food Properties, 20, 1-4, 810-820) used mung bean, cassava and rice starch to embed menthone, respectively, and the obtained loading rates were 4.2%, 4.2% and 0.6%, respectively, and the embedding rate was lower.

Chinese invention patent CN201710830140.5 disclosed a thymol nanoemulsion, which used oil, 1-10 parts of thymol as oil phase, 30-50 parts of EL-40 as emulsifier, and distilled water as water phase to prepare an oil-in-water emulsion. The patent used large amount of emulsifier, which not only did not conform to the natural and green production concept, but also increased the production cost, and which is not conducive to its application in the field of food and daily chemicals.

Chinese invention patent CN201811244796.X disclosed an integrated process of supercritical $CO_2$ extraction of aroma components of Tieguanyin tea and the PGSS method for preparing a microcapsule, using food-grade paraffin as a wall material for the microcapsule, and using Particles Formation from Gas-Saturated Solutions technology (PGSS) to microencapsulate the aroma of Tieguanyin tea. A device for the supercritical $CO_2$ extraction required by this patent is huge and expensive, which will lead to extremely high product cost.

SUMMARY OF THE INVENTION

An objective of the present invention is to provide a preparation method for starch-based microcapsule embedding aroma substances, which has the advantages of simple operation, low cost, no need of using emulsifiers, easy storage and transportation, and high efficiency. The preparation method of the present invention is the extension and development of current microcapsule-embedding technology.

The objectives of the present invention are realized by the following technical solutions.

A preparation method for a starch-embedded aroma substance microcapsule comprises performing degreasing treatment on starch, gelatinizing starch at high temperature, sequentially adding aroma substances having different molecular sizes into the starch paste, and complexing at high temperature; and finally cooling, centrifuging, washing, and drying, to obtain an aroma substance microcapsule. It specifically comprises the following steps:

(1) performing degreasing treatment on starch;

(2) high-temperature treatment: dispersing the degreased starch in the step (1) into distilled water to formulate a starch slurry in a range of 5%~15%, treating at high temperature of 120~180° C. for 40~60 min, and then cooling to 50~100° C. to obtain a starch paste; and (3) preparation for microcapsule: firstly dispersing an aroma substance with larger molecular cross-sectional area in the starch paste in the step (2), stirring and complexing at 50~90° C. for 20~40 min, and adding an aroma substance with smaller molecular cross-sectional area, continuing stirring and complexing for 20~40 min, then naturally cooling, standing still, centrifuging, washing, and drying, to obtain a white powdered product which is a starch-embedded aroma substance microcapsule.

Preferably, in the step (1), the degreasing treatment is performing degreasing treatment on the starch via Soxhlet extraction method or hot dimethyl sulfoxide (DMSO) alcohol precipitation method.

Preferably, in the step (1), the Soxhlet extraction method is wrapping the starch with filter paper, putting into a Soxhlet extractor, continuously refluxing and extracting with diethyl ether for 4~9 h; and after finishing the extracting, washing the starch for several times with 50%~90% ethanol, then centrifuging, drying and crushing, to obtain the degreased starch.

Preferably, the hot dimethyl sulfoxide (DMSO) alcohol precipitation method is dispersing the starch in 80%~100% (v/v) dimethyl sulfoxide, stirring and heating in boiling water bath for 40~60 min; and adding anhydrous ethanol to precipitate the starch, then centrifuging, washing the starch with anhydrous ethanol, drying and crushing, to obtain the degreased starch.

Preferably, the mass ratio of the two aroma substances in the step (3) is 10:1~1:10.

Preferably, the mass ratio of the two aroma substances is 3:1~1:3.

Preferably, in the step (3), the mass ratio of the starch to the aroma substances is 3:1~1:3.

Preferably, in the step (1), the starch is one or more of corn, wheat, potato and cassava starch, wherein the content of an amylose is more than 50%.

Preferably, in the step (1), the drying is drying in a blast drying oven at 50~80° C. for 2~4 h; and in the step (3), the washing is sequentially washing with anhydrous ethanol and distilled water, and the time for the standing still is 8~24 h.

Preferably, in the step (2), the high-temperature treatment is oil-bath heating or high-pressure steam cooking with a jet liquefier.

A starch-embedded aroma substance microcapsule was prepared by the above-described method.

Compared with the prior art, the present invention has the following advantages.

(1) The present method can significantly improve the embedding rate of aroma substances. The content of aroma substances in the complex of the present invention is 93.94~116.61 mg/g, and total embedding rate reaches 46.64% (w/w). In the present invention, high-temperature treatment is performed after degreasing treatment on starch, so that the starch chain is in a freely coiled state. The addition of aroma substances can induce the transformation from the freely coiled linear fragment of starch to a single helix structure with inside hydrophobicity and outside hydrophilicity, and the aroma molecules are wrapped in the hydrophobic cavity. Taking advantage of the synergistic complexing property of the two aroma molecules with the linear fragment of starch, one aroma molecule will induce the starch chain to form more helices after entering the cavity, so as to attract more aroma molecules into the helical cavity. Due to the characteristic of flexibility of the amylose, when the aroma molecules with larger cross-sectional area are first complexed with starch chains, they can induce the formation of larger helical cavities, making it easier for molecules with smaller cross-sectional areas to enter the cavity, thereby making the embedding rate of aroma substances greatly improved.

(2) The process for embedding aroma substances in the present invention is simple and convenient, being easy to control conditions, without the need to use large-scale special equipment, greatly reducing production costs, and having high efficiency, which is more conducive to industrialized production.

(3) The aroma microcapsule prepared in the present invention has good stability, can be used directly or as ingredients for food preservation, medicine and health care, and daily chemical products, and is easy to store and transport. As a wall material for the prepared microcapsule, starch has a wide source of raw material, is safe and cheap, and can significantly reduce the cost of the prior art and improve the fragrance-retention quality of product.

BRIEF DESCRIPTION OF THE DRAWINGS

FIG. 1 is a SEM photograph of the aroma microcapsule prepared in Example 1.

DETAILED DESCRIPTION OF THE PREFERRED EMBODIMENTS

In order to better understand the present invention, the present invention will be further described below in conjunction with Examples, but the protection scope claimed in the present invention is not limited to the scope described in Examples.

In Examples, the content of aroma substances in the complex is measured by gas chromatography. 20 mg of the complex is dissolved in 2 mL of KOH (1 M), and vortexed for 30 s (to a clarified and dissolved state). 5 mL of ethyl acetate is added, and aroma substances are extracted for 4 times by vortexing for 2 min. The aroma substances are passed through a filter membrane, and transferred to a gas-phase bottle. Gas chromatography is equipped with hydrogen flame ionization detector (FID) and Agilent HP-5 capillary column, with nitrogen gas as a carrier gas. Measuring conditions are as follows: injection volume of 1 μL, split ratio of 20:1; an initial temperature of chromatographic column of 80° C., kept for 1 min, raising to 250° C. at 30° C./min, kept for 2 min; the inlet temperature of 250° C.; the detector temperature of 250° C.; and the flow rate of carrying flow of 1 mL/min. The corresponding peak area thereof is converted to a concentration according to the standard substance of aroma substances.

Comparative Example 1

The following steps are performed:
(1) Degreasing of Starch
    wrapping high-amylose corn starch with filter paper, putting into a Soxhlet extractor, continuously refluxing and extracting with diethyl ether for 8 h; and after finishing the extracting, washing the starch for several times with 85% ethanol, then centrifuging, drying in a blast drying oven at 60° C. for 3 h, and crushing, to obtain a degreased starch;
(2) High-Temperature Treatment
    dispersing 1 g of the degreased starch in the step (1) into distilled water to formulate 5% of a starch slurry, and heating in oil bath at 160° C. for 60 min, then cooling to 80° C.; and
(3) Preparation for Aroma Microcapsule
    firstly dispersing 0.5 g decylaldehyde with smaller molecular cross-sectional area in the starch slurry in the step (2), stirring and complexing at 80° C. for 30 min, adding 0.5 g thymol with larger molecular cross-sectional area, continuing stirring and complexing for 30 min, then cooling to room temperature, standing still for 24 h, centrifuging, washing, and freeze drying for 48 h, to obtain a white powdered product which is an aroma microcapsule.

After testing, the content of aroma substances in the resulting complex is 71.72 mg/g, and the total embedding rate is 26.85%.

Comparative Example 2

The following steps are performed:
(1) Degreasing of Starch
    wrapping high-amylose corn starch with filter paper, putting into a Soxhlet extractor, continuously refluxing and extracting with diethyl ether for 8 h; and after finishing the extracting, washing the starch for several times with 85% ethanol, then centrifuging, drying in a blast drying oven at 60° C. for 3 h, and crushing, to obtain a degreased starch;
(2) High-Temperature Treatment
    dispersing 1 g the degreased starch in the step (1) into distilled water to formulate 5% of a starch slurry, and heating in oil bath at 160° C. for 60 min, then cooling to 80° C.; and (3) Preparation for Aroma Microcapsule firstly stirring and mixing thoroughly 0.5 g decylaldehyde and 0.5 thymol at 80° C. for 20 min, dispersing the same into the starch slurry in the step (2), stirring and complexing at 40° C., then cooling to room temperature, standing still for 24 h, centrifuging, washing, and freeze drying for 48 h, to obtain a white powdered product which is an aroma microcapsule.

After testing, the content of aroma substances in the resulting complex is 68.58 mg/g, and the total embedding rate is 24.16%.

Comparative Example 3

The following steps are performed:
(1) Degreasing of Starch wrapping high-amylose corn starch with filter paper, putting into a Soxhlet extractor, continuously refluxing and extracting with diethyl ether for 8 h; and after finishing the extracting, washing the starch for several times with 85% ethanol, then centrifuging, drying in a blast drying oven at 60° C. for 3 h, and crushing, to obtain a degreased starch;
(2) High-Temperature Treatment dispersing 1 g the degreased starch in the step (1) into distilled water to formulate 5% of a starch slurry, and heating in oil bath at 160° C. for 60 min, then cooling to 80° C.; and
(3) Preparation for Aroma Microcapsule dispersing 1 g decylaldehyde into the starch slurry in the step (2), complexing at 80° C. for 60 min, then cooling to room temperature, standing still for 24 h, centrifuging, washing, and freeze drying for 48 h, to obtain a white powdered product which is an aroma microcapsule.

After testing, the content of aroma substances in the resulting complex is 15.49 mg/g, and the total embedding rate is 3.11%.

Example 1

The following steps are performed:
(1) Degreasing of Starch wrapping high-amylose corn starch with filter paper, putting into a Soxhlet extractor, continuously refluxing and extracting with diethyl ether for 8 h; and after finishing the extracting, washing the starch for several times with 85% ethanol, then centrifuging, drying in a blast drying oven at 60° C. for 3 h, and crushing, to obtain a degreased starch;
(2) High-Temperature Treatment dispersing 1 g the degreased starch in the step (1) into distilled water to formulate 5% of a starch slurry, and heating in oil bath at 160° C. for 60 min, then cooling to 80° C.; and
(3) Preparation for Aroma Microcapsule firstly dispersing 0.5 g thymol with larger molecular cross-sectional area into the starch slurry in the step (2), stirring and complexing at 80° C. for 30 min, then adding 0.5 g decylaldehyde with smaller molecular cross-sectional area, continuously stirring and complexing for 30 min, then cooling to room temperature, standing still for 24 h, centrifuging, washing, and freeze drying for 48 h, to obtain a white powdered product which is an aroma microcapsule.

After testing, the content of aroma substances in the resulting complex is 116.62 mg/g, and the total embedding rate is 46.64%. FIG. 1 is a SEM photograph of the aroma microcapsule in Example 1. The prepared aroma microcapsule has a particle diameter between 20 and 50 μm, and no longer dense and smooth surface, showing a porous structure and a lamellar structure. The loose structure is conducive to capturing and loading aroma substances.

Example 2

The following steps are performed:
(1) Degreasing of Starch dispersing high-amylose corn starch in 90% (v/v) DMSO, stirring and heating in boiling water bath for 60 min; adding anhydrous ethanol to precipitate the starch, then centrifuging, washing the starch with anhydrous ethanol, drying in a blast drying oven at 80° C. for 3 h, and crushing, to obtain a degreased starch;
(2) High-Temperature Treatment dispersing 1 g the degreased starch in the step (1) into distilled water to formulate 15% of a starch slurry, cooking at 180° C. for 60 min by high-pressure steam with a jet liquefier, then cooling to 90° C.; and
(3) Preparation for Aroma Microcapsule dispersing 0.25 g thymol with larger molecular cross-sectional area in the starch slurry in the step (2), stirring and complexing at 90° C. for 40 min, then adding 0.75 g decylaldehyde with smaller molecular cross-sectional area, continuously stirring and complexing for 40 min, then cooling to room temperature, standing still for 12 h, centrifuging, washing, drying in a vacuum drying oven at 50° C. for 6 h, to obtain a white powdered product which is an aroma microcapsule.

After testing, the content of aroma substances in the resulting complex is 100.44 mg/g, and the total embedding rate is 40.46%.

Example 3

The following steps are performed:
(1) Degreasing of Starch wrapping high-amylose corn starch with filter paper, putting into a Soxhlet extractor, continuously refluxing and extracting with diethyl ether for 4 h; and after finishing the extracting, washing the starch for several times with 50% ethanol, then centrifuging, drying in a blast drying oven at 60° C. for 3 h, and crushing, to obtain a degreased starch;
(2) High-Temperature Treatment dispersing 1 g the degreased starch in the step (1) into distilled water to formulate 5% of a starch slurry, and heating in oil bath at 120° C. for 60 min, then cooling to 60° C.; and
(3) Preparation for Aroma Microcapsule dispersing 0.75 g thymol with larger molecular cross-sectional area in the starch slurry in the step (2), stirring and complexing at 60° C. for 30 min, then adding 0.25 g decylaldehyde with smaller molecular cross-sectional area, continuously stirring and complexing for 30 min, then cooling to room temperature, standing still for 8 h, centrifuging, washing, and naturally air drying, to obtain a white powdered product which is an aroma microcapsule.

After testing, the content of aroma substances in the resulting complex is 113.93 mg/g, and the total embedding rate is 40.36%.

Example 4

The following steps are performed:
(1) Degreasing of Starch dispersing high-amylose corn starch in 90% (v/v) DMSO, stirring and heating in boiling water bath for 40 min; adding anhydrous ethanol to precipitate the starch, then centrifuging, washing the starch with anhydrous ethanol, drying in a blast drying oven at 80° C. for 4 h, and crushing, to obtain a degreased starch;

(2) High-Temperature Treatment dispersing 1 g the degreased starch in the step (1) into distilled water to formulate 10% of a starch slurry, cooking at 160° C. for 60 min by high-pressure steam with a jet liquefier, then cooling to 70° C.; and (3) Preparation for Aroma Microcapsule dispersing 0.5 g thymol with larger molecular cross-sectional area into the starch slurry in the step (2), stirring and complexing at 70° C. for 20 min, then adding 0.5 g decylaldehyde with smaller molecular cross-sectional area, continuously stirring and complexing for 40 min, then cooling to room temperature, standing still for 16 h, centrifuging, washing, and freeze drying for 48 h, to obtain a white powdered product which is an aroma microcapsule.

After testing, the content of aroma substances in the resulting complex is 93.94 mg/g, and the total embedding rate is 37.55%.

Example 5

The following steps are performed:

(1) Degreasing of Starch wrapping high-amylose corn starch with filter paper, putting into a Soxhlet extractor, continuously refluxing and extracting with diethyl ether for 8 h; and after finishing the extracting, washing the starch for several times with 85% ethanol, then centrifuging, drying in a blast drying oven at 60° C. for 3 h, and crushing, to obtain a degreased starch;

(2) High-Temperature Treatment dispersing 1 g the degreased starch in the step (1) into distilled water to formulate 5% of a starch slurry, and heating in oil bath at 150° C. for 60 min, then cooling to 90° C.; and (3) Preparation for Aroma Microcapsule firstly dispersing 0.5 g thymol with larger molecular cross-sectional area in the starch slurry in the step (2), stirring and complexing at 90° C. for 30 min, then adding 0.5 g decylaldehyde with smaller molecular cross-sectional area, continuously stirring and complexing for 30 min, then cooling to room temperature, standing still for 18 h, centrifuging, washing, and freeze drying for 48 h, to obtain a white powdered product which is an aroma microcapsule.

After testing, the content of aroma substances in the resulting complex is 98.62 mg/g, and the total embedding rate is 38.27%.

TABLE 1

Embedding rate of aroma substances in complex

| | Embedding rate (%) | | |
|---|---|---|---|
| Sample | Decylaldehyde | Thymol | Total aroma substances |
| Comparative Example 1 | 5.95 ± 0.09 | 20.9 ± 0.44 | 26.85 ± 0.52 |
| Comparative Example 2 | 4.22 ± 0.02 | 19.95 ± 0.35 | 24.16 ± 0.36 |
| Comparative Example 3 | 3.11 ± 0.15 | 0 ± 0 | 3.11 ± 0.15 |
| Example 1 | 10.09 ± 0.08 | 36.54 ± 0.71 | 46.64 ± 0.78 |
| Example 2 | 7.22 ± 0.79 | 33.24 ± 0.30 | 40.46 ± 0.62 |
| Example 3 | 14.96 ± 0.26 | 25.4 ± 0.69 | 40.36 ± 0.81 |
| Example 4 | 9.09 ± 0.26 | 28.46 ± 0.40 | 37.55 ± 0.65 |
| Example 5 | 9.53 ± 0.58 | 28.74 ± 0.67 | 38.27 ± 1.26 |

Table 1 shows the embedding rate of aroma substances in the complex. The embedding rates of decylaldehyde and thymol in Examples are significantly higher than those in Comparative Examples. In Examples, thymol with larger molecular cross-sectional area is first complexed with starch to form V6III type complex, which is beneficial to induce the starch chain to form a larger helical cavity first, so that the decylaldehyde with smaller molecular cross-sectional area added later can more easily enter the helical cavity. The synergistic effect between the two aroma molecules is stronger, and they can mutually promote the complexing with starch, so the embedding rate is higher. As a result, the sample obtained in Example 1 has the best effect on embedding aroma substances.

In Comparative Example 1, decylaldehyde with smaller molecular cross-sectional area is first added to form V6I type complex with starch. The complex formed by thymol and starch is V6III type, wherein thymol with larger molecular cross-sectional area requires a larger helical cavity, which cannot be satisfied by the cavity size induced through the first addition of decylaldehyde molecules. Therefore, this complexing mode will weaken the synergistic effect between the two aroma molecules, with more competitive effect of the two aroma substances on the starch chain. In Comparative Example 2, the two guest molecules are complexed at 80° C. for a period of time, and then complexed with starch. The embedding rate of the obtained sample is lower than those of Example 1 and Comparative Example 1, indicating that the two aroma molecules are combined into a larger molecule and it is not conducive to the embedding of starch. In Comparative Example 3 in which the same mass of decylaldehyde is used as control of Examples, the embedding rate of aroma substances is the lowest, which proves in turn that aroma substances with larger molecular cross-sectional area can synergistically promote starch to embed the substances with smaller molecular cross-sectional area, so that the embedding rate of the aroma microcapsule obtained by the present invention is greatly improved.

The method for preparing microcapsule with starch-embedded aroma substances proposed in the present invention has the advantages of convenient preparation, simple equipment, significantly improved embedding effect, and easy storage and transportation, and can meet the current embedding needs of the food and daily chemical industries.

It should be noted that, for ordinary skilled in the technical field to which the present invention belongs, embodiments of the present invention are not limited to the above Examples. Any other changes, modification, substitution, combination and simplification without deviating from the spiritual essence and principles of the present invention shall be equivalent replacement modes and shall all be included in the protection scope of the present invention.

What is claimed is:

1. A preparation method for starch-embedded aroma substance microcapsule, characterized in that, it comprises the following steps:
   (1) performing degreasing treatment on starch;
   (2) high-temperature treatment: dispersing the degreased starch in the step (1) into distilled water to formulate a starch slurry in a range of 5%~15%, and treating at high temperature of 120~180° C. for 40~60 min, then cooling to 50~100° C. to obtain a starch paste; and
   (3) preparation for microcapsule: firstly dispersing an aroma substance with larger molecular cross-sectional area in the starch paste in the step (2), stirring and complexing at 50~90° C. for 20~40 min, adding an aroma substance with smaller molecular cross-sectional area, continuing stirring and complexing for 20~40 min, then naturally cooling, standing still, centrifuging, washing, and drying, to obtain a white powdered product which is the starch-embedded aroma substance microcapsule.

2. The preparation method according to claim 1, characterized in that, the degreasing treatment in the step (1) is performing degreasing treatment on the starch via Soxhlet extraction method or hot dimethyl sulfoxide (DMSO) alcohol precipitation method.

3. The preparation method according to claim 2, characterized in that, in the step (1), the Soxhlet extraction method is wrapping the starch with filter paper, putting into a Soxhlet extractor, continuously refluxing and extracting with diethyl ether for 4~9 h; and after finishing the extracting, washing the starch for several times with 50%~90% ethanol, then centrifuging, drying and crushing, to obtain the degreased starch; and the hot dimethyl sulfoxide (DMSO) alcohol precipitation method is dispersing the starch in 80%~100% (v/v) dimethyl sulfoxide, stirring and heating in boiling water bath for 40~60 min; adding anhydrous ethanol to precipitate the starch, then centrifuging, washing the starch with anhydrous ethanol, drying and crushing, to obtain the degreased starch.

4. The preparation method according to claim 3, characterized in that, the mass ratio of the two aroma substances in the step (3) is 10:1~1:10.

5. The preparation method according to claim 4, characterized in that, the mass ratio of the two aroma substances is 3:1~1:3.

6. The preparation method according to claim 5, characterized in that, the mass ratio of the starch to the aroma substances in the step (3) is 3:1~1:3.

7. The preparation method according to claim 6, characterized in that, the starch in the step (1) is one or more of corn starch, wheat starch, potato starch and cassava starch, wherein the content of an amylose is more than 50%.

8. The preparation method according to any one of claim 1, characterized in that, the drying in the step (1) is drying in a blast drying oven at 50~80° C. for 2~4 h; and in the step (3), the washing is sequentially washing with anhydrous ethanol and distilled water, and the time for the standing still is 8~24 h.

9. The preparation method according to any one of claim 1, characterized in that, the high-temperature treatment in the step (2) is oil-bath heating or high-pressure steam cooking with a jet liquefier.

10. A starch-embedded aroma substance microcapsule prepared according to the preparation method of any one of claim 1.

* * * * *